(12) United States Patent
Nishitani et al.

(10) Patent No.: US 9,405,890 B1
(45) Date of Patent: Aug. 2, 2016

(54) EASY LOGIN ON WEARABLE DEVICE AND WEARABLE DEVICE APPLICATIONS

(71) Applicant: International Business Machines Corporation, Armonk, NY (US)

(72) Inventors: Yusuke Nishitani, Tokyo (JP); Masaki Saitoh, Yokohama (JP); Asuka Unno, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/945,572

(22) Filed: Nov. 19, 2015

(51) Int. Cl.
*G06F 7/04* (2006.01)
*G06F 21/31* (2013.01)
*G06F 21/45* (2013.01)

(52) U.S. Cl.
CPC ................ *G06F 21/31* (2013.01); *G06F 21/45* (2013.01)

(58) Field of Classification Search
CPC .................................. G06F 21/31; G06F 21/45
USPC .......................................................... 726/19
See application file for complete search history.

(56) References Cited

U.S. PATENT DOCUMENTS

| 6,720,860 | B1 | 4/2004 | Narayanaswami | |
| 8,928,587 | B1* | 1/2015 | Smus | H04W 4/006 345/156 |
| 8,976,965 | B2* | 3/2015 | Aminzade | H04L 41/0816 380/258 |
| 9,084,284 | B1 | 7/2015 | Shipley et al. | |
| 2015/0039880 | A1* | 2/2015 | Aminzade | H04L 41/0816 713/100 |
| 2015/0121515 | A1 | 4/2015 | Aratsu et al. | |
| 2015/0161377 | A1* | 6/2015 | Rodzevski | G06F 21/35 726/18 |
| 2015/0163672 | A1 | 6/2015 | Jin et al. | |
| 2015/0172827 | A1* | 6/2015 | Sharpe | G06F 21/31 381/312 |
| 2015/0222576 | A1* | 8/2015 | Anderson | G06F 9/4443 715/752 |
| 2015/0294109 | A1 | 10/2015 | Kanzaki et al. | |

FOREIGN PATENT DOCUMENTS

| JP | 2002101459 A | 4/2002 |
| JP | 2013021499 A | 1/2013 |
| JP | 2014123177 A | 7/2014 |
| JP | 2015087907 A | 5/2015 |
| JP | 2015203924 A | 11/2015 |

OTHER PUBLICATIONS

"One time Image password authentication based on an Indexing order", An IP.com Prior Art Database Technical Disclosure, IP.com No. 000239727, IP.com Electronic Publication: Nov. 27, 2014, pp. 1-2.

* cited by examiner

*Primary Examiner* — Teshome Hailu
(74) *Attorney, Agent, or Firm* — Alexa L. Ashworth

(57) ABSTRACT

Embodiments of the present invention provide a method, computer program product, and computer system for login on a wearable device. The method includes detecting one or more preregistered devices near a first wearable device. In response to determining that the detected one or more registered devices is greater than or equal to a predetermined number set forth in a simple password, the method requests the simple password from the user. If the correct simple password is entered, a first set of login information for the first wearable device is automatically inputted. The method may also include automatically inputting a second set of login information for one or more applications on the first wearable device.

17 Claims, 6 Drawing Sheets

EASY LOGIN ON WEARABLE DEVICE AND WEARABLE DEVICE APPLICATIONS

BACKGROUND OF THE INVENTION

The present invention relates generally to the field of wearable devices, and more particularly to using detected surrounding devices to provide easy login on a wearable device.

Wearable technology, wearables, fashionable technology, wearable devices, tech togs, or fashion electronics are clothing and accessories incorporating computer and advanced electronic technologies. The designs often incorporate practical functions and features, but may also have a purely critical or aesthetic agenda. Wearable devices such as activity trackers are a good example of the Internet of Things (IoT), since they are part of the network of physical objects or "things" embedded with electronics, software, sensors and connectivity to enable objects to exchange data with a manufacturer, operator and/or other connected devices, without requiring human intervention. Wearable Technology is on the rise in personal and business use.

A password is a word or string of characters used for user authentication to prove, identify, or access approval to gain access to a resource (i.e., an access code is a type of password), which should be kept secret from those not allowed access. User names and passwords are commonly used by people during a log in process that controls access to protected computer operating systems, mobile phones, cable TV decoders, automated teller machines (ATMs), etc. A typical computer user has passwords for many purposes: logging into accounts, retrieving e-mail, accessing applications, databases, networks, web sites, and even reading the morning newspaper online.

SUMMARY

A method, computer program product, and computer system for login on a wearable device are provided, the method comprising: detecting, by one or more computer processors, one or more registered devices near a first wearable device, wherein the first wearable device is configured to receive a password; determining, by one or more computer processors, whether the detected one or more registered devices is greater than or equal to a predetermined number; in response to determining that the detected one or more registered devices is greater than or equal to the predetermined number, requesting, by one or more computer processors, from a user, the password; determining, by one or more computer processors, whether the password matches a predefined password order; and in response to determining that the password matches the predefined password order, automatically inputting, by one or more computer processors, a first set of login information for the first wearable device.

DETAILED DESCRIPTION

Wearable devices, such as smartwatches, typically have very small user interface screens. These small screens make it difficult to input characters and it is therefore difficult to input a username and a password for password authentication. Embodiments of the present invention provide systems and methods for logging into a wearable device by selecting pre-registered devices in a correct order.

Figure 1:
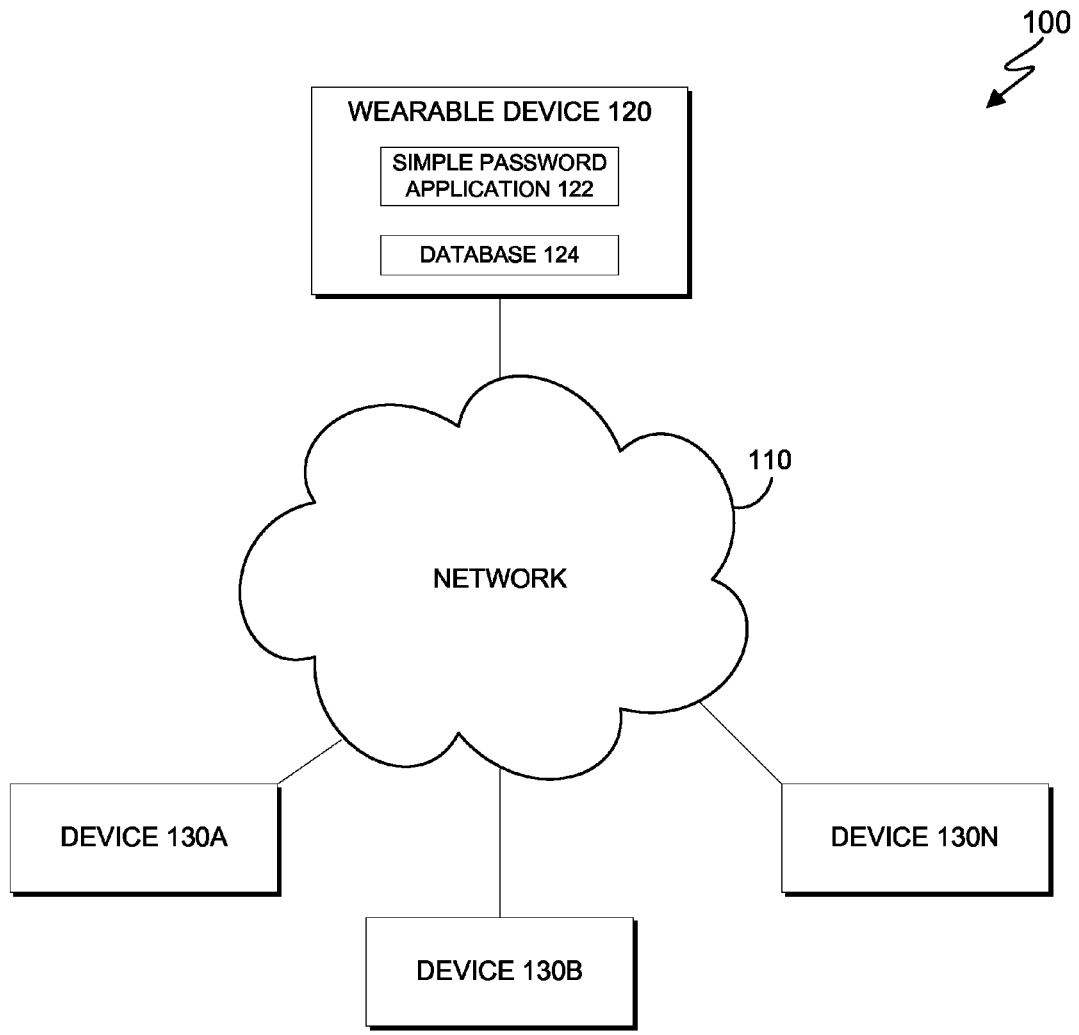
FIG. 1 is a functional block diagram illustrating an environment, in accordance with an embodiment of the present invention.

The present invention will now be described in detail with reference to the figures. FIG. 1 is a functional block diagram illustrating a wearable device login environment, generally designated 100, in accordance with one embodiment of the present invention. FIG. 1 provides only an illustration of one implementation, and does not imply any limitations with regard to the environments in which different embodiments may be implemented. Many modifications to the depicted environment may be made by those skilled in the art without departing from the scope of the invention as recited by the claims. In an exemplary embodiment, wearable device login environment 100 includes wearable device 120 and devices 130A, 130B, and 130N interconnected over network 110.

Network 110 can be, for example, a local area network (LAN), a wide area network (WAN) such as the Internet, or a combination of the two, and can include wired, wireless, or fiber optic connections. Network 110 may also be Bluetooth, or a similar method of connecting devices. In general, network 110 can be any combination of connections and protocols that will support communication between wearable device 120 and devices 130A, 130B, and 130N.

Devices 130A, 130B, and 130N (devices 130A-N) may be any computing device, such as a laptop computer, a tablet computer, a netbook computer, a personal computer (PC), a desktop computer, a personal digital assistant (PDA), a smart phone or wearable device, a thin client, or any programmable electronic device capable of communicating with wearable device 120 via network 110. In other embodiments, devices 130A-N may be a management server, a web server, or any other electronic device or computing system capable of receiving and sending data. Devices 130A-N may include internal and external hardware components, as depicted and described in further detail with respect to FIG. 6.

Wearable device 120 may be any wearable computing device, such as a smartwatch, capable of communicating with devices 130A-N via network 110. Wearable device 120 includes simple password application 122 and database 124.

Simple password application 122 is capable of registering devices 130A-N, registering a simple password using registered devices, and prompting the user to enter the registered simple password or normal password to grant access to wearable device 120.

Database 124 is a central storage for a set of user registered device data. Database 124 can be implemented using any non-volatile storage medium known in the art. For example, authentication database can be implemented with a tape library, optical library, one or more independent hard disk drives, or multiple hard disk drives in a redundant array of independent disks (RAID). In this exemplary embodiment, database 124 contains the device information for each registered device. For example, database 124 may contain the serial number of a mobile cellular device and the name of the user who registered it.

Figure 2:
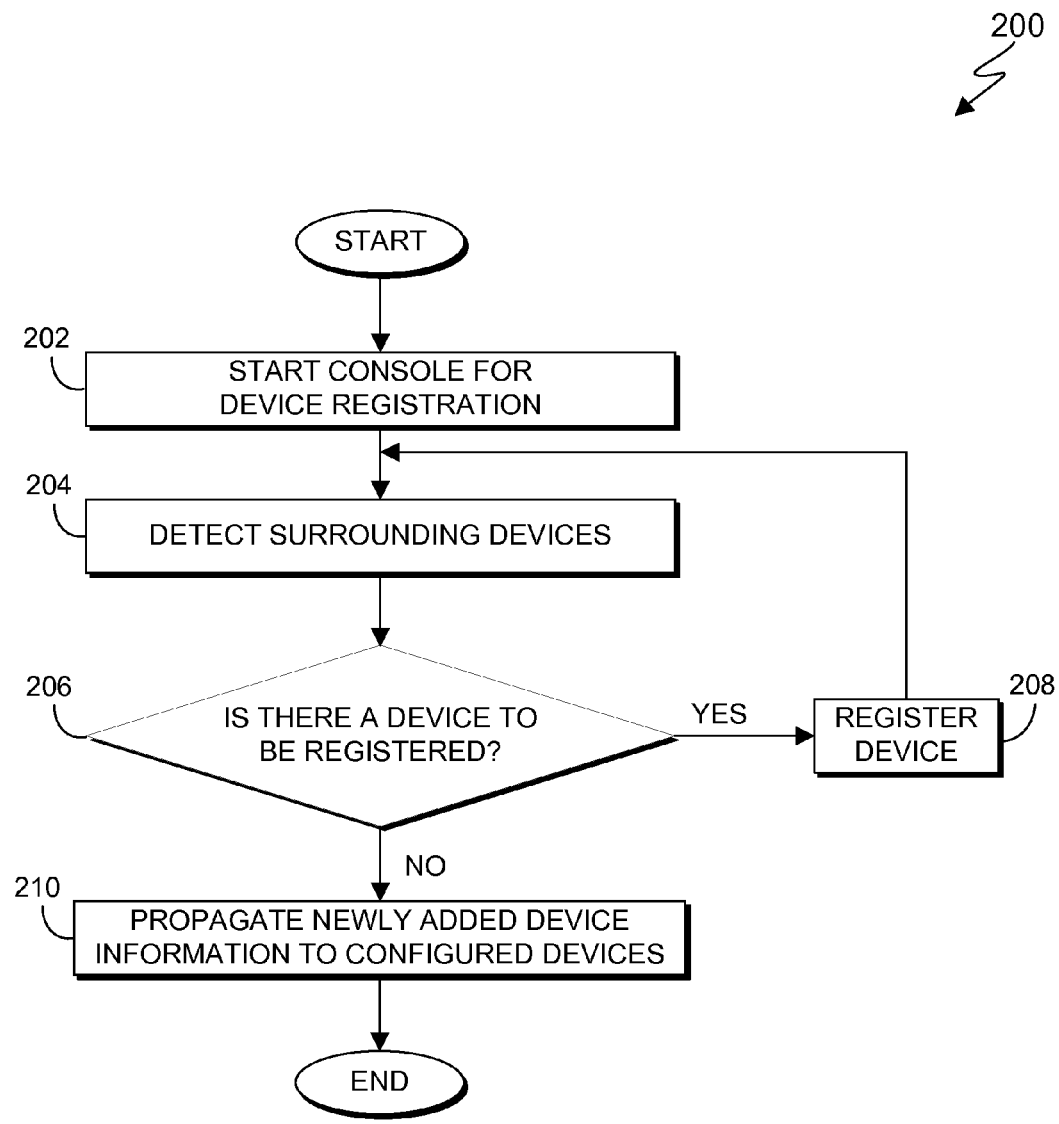
FIG. 2 is a flowchart depicting operational steps for registering devices in the simple password application, in accordance with an embodiment of the present invention.

FIG. 2 is a flowchart, 200, depicting operational steps for registering devices in the simple password application, in accordance with an embodiment of the present invention.

In step 202, simple password application 122 initiates the console for device registration. In this exemplary embodiment, simple password application 122 requires the user to login to wearable device 120 normally (i.e., with a username and password containing characters) to access simple password application 122 for device registration.

In step 204, simple password application 122 detects all surrounding devices. In this exemplary embodiment, simple password application 122 detects all devices within network 110. As previously stated, devices may be detected using Bluetooth or any other suitable method of communication. For example, simple password application 122 detects devices 130A, 130B, and 130N.

In step 206, simple password application 122 determines whether there is a device to be registered. In this exemplary embodiment, simple password application 122 detects unregistered devices and prompts the user to choose to register the device or to not register the device. For example, simple password application 122 detects devices 130A, 130B, and 130N and determines that device 130N is already registered. Simple password application 122 will prompt the user to choose whether to register devices 130A and 130B.

If, in step 206, the user chooses to register the unregistered device, then in step 208, simple password application 122 registers the device. In this exemplary embodiment, simple password application 122 registers the unregistered device and stores device data in database 124. For example, simple password application 122 detects that device 130A is unregistered. Simple password application 122 will prompt the user to choose to register or ignore device 130A. If the user chooses to register device 130A then simple password application 122 will register device 130A and store information associated with device 130A in database 124. Simple password application 122 will then begin again from step 204 and detect surrounding devices.

If, in step 206, the user chooses to not register the device or there are no unregistered devices detected, then in step 210, simple password application 122 propagates newly added device information to all configured devices. In this exemplary embodiment, simple password application 122 propagates information to other configured devices, which are devices configured to use simple password application 122, that use the same simple password. For example, simple password application 122 propagates information (i.e., information regarding registered devices and the registered simple password) from SmartWatch (A) to SmartGlass (B) and SmartRing (C) because SmartWatch (A), SmartGlass (B), and SmartRing (C) are each configured with simple password application 122 and can all be logged into using the same simple password. In another embodiment, simple password application 122 presents propagating information to other devices as an option, and the user may preselect whether to propagate information to other configured devices. For example, if the user intends on using the same simple password for SmartWatch (A), SmartGlass (B), and SmartRing (C), then the user can activate the propagating information option (i.e., select "propagate" from the settings of simple password application 122). If the user does not wish to use the same simple password for SmartWatch (A), SmartGlass (B), and SmartRing (C) (i.e., each device uses a different simple password), the user can deactivate the propagating information option (i.e., select "do not propagate" from the settings of simple password application 122), as there is no need to transfer information to these configured devices.

Accordingly, by performing the operational steps of FIG. 2, surrounding devices can be detected and a user can register, or choose to not register, unregistered devices with simple password application 122.

Figure 3:
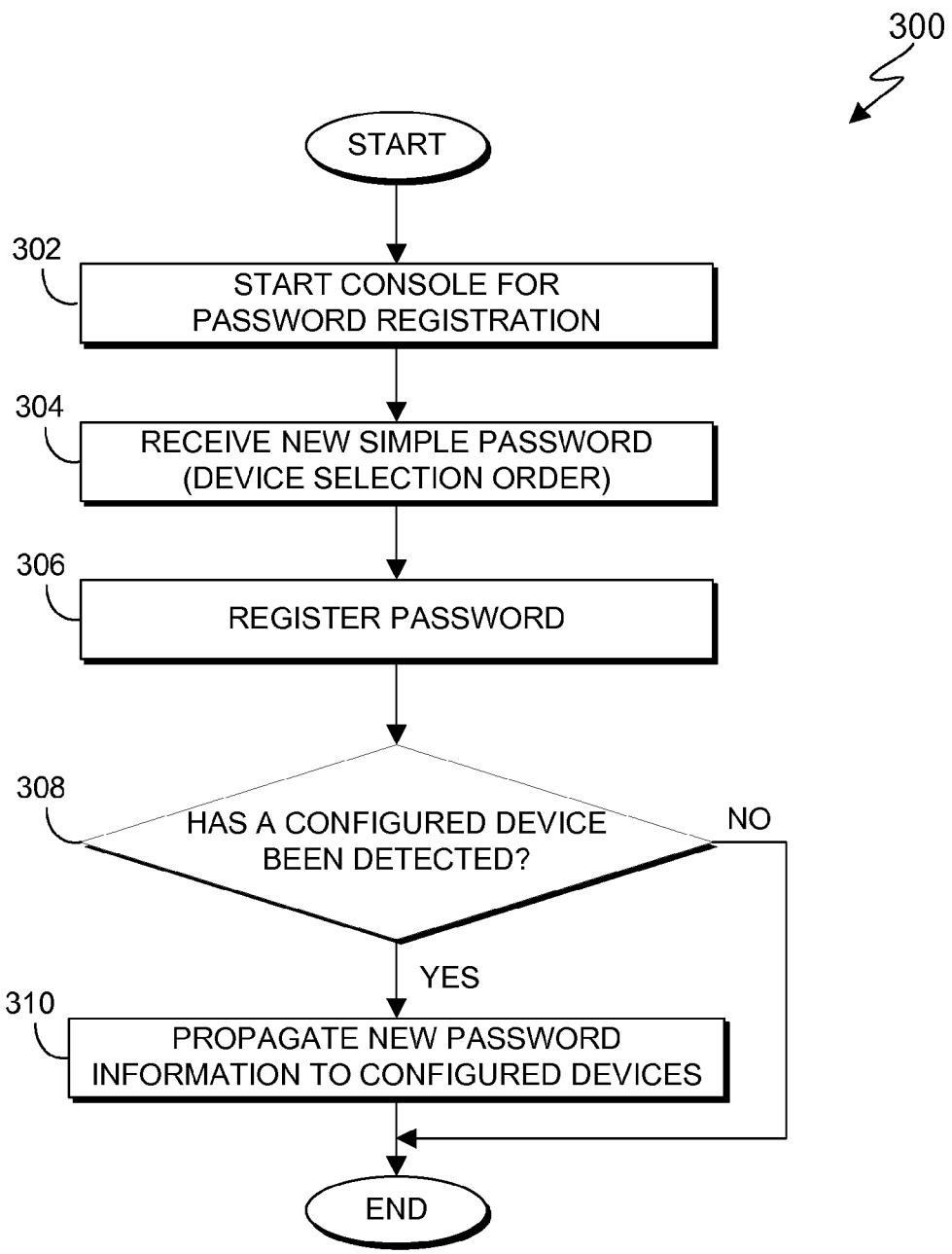
FIG. 3 is a flowchart depicting operational steps for registering a simple password in the simple password application, in accordance with an embodiment of the present invention.

FIG. 3 is a flowchart, 300, depicting operational steps for registering a simple password in simple password application 122, in accordance with an embodiment of the present invention.

In step 302, simple password application 122 initiates the console for simple password registration. In this exemplary embodiment, for initial simple password setup, simple password application 122 requires the user to login to wearable device 120 normally (i.e., with a username and password containing characters) to access simple password application 122 for simple password registration. In another embodiment, to change an existing simple password, simple password application 122 requires the user to login to wearable device 120 either normally or using the existing simple password.

In step 304, simple password application 122 receives the new simple password. In this exemplary embodiment, simple password application 122 displays all registered devices to the user on wearable device 120 interface. The user selects the registered devices in a specific order. This specific device selection order is the new simple password. It should be appreciated that the user may choose to select a number of devices less than the number of registered devices displayed. For example, if devices 130A, 130B, and 130N are registered and displayed to the user, the user can choose device 130A and 130B only, as the simple password. In another embodiment, a user can drag the displayed registered devices to specific locations on wearable device 120 interface. The specific location selection is the new simple password.

In step 306, simple password application 122 registers the specific device selection as the new simple password. In this exemplary embodiment, simple password application 122 registers the new simple password and stores information associated with the new simple password in database 124.

In step 308, simple password application 122 detects surrounding configured devices. In this exemplary embodiment, simple password application 122 determines whether there are any other configured devices (i.e., devices configured to use simple password application) located nearby.

If, in step 308, simple password application 122 determines that a device has been detected, then in step 310 simple password application 122 propagates newly added simple password information to other configured devices. In this exemplary embodiment, simple password application 122 propagates information to other devices, which are configured to use simple password application 122, that use the same simple password. As previously described (step 210), in another embodiment, simple password application 122 can present propagating information to other configured devices as an option, to be set by the user.

Accordingly, by performing the operational steps of FIG. 3, registered devices are displayed and a user selects the displayed registered devices in a specific order so as to register a simple password with simple password application 122.

Figure 4:
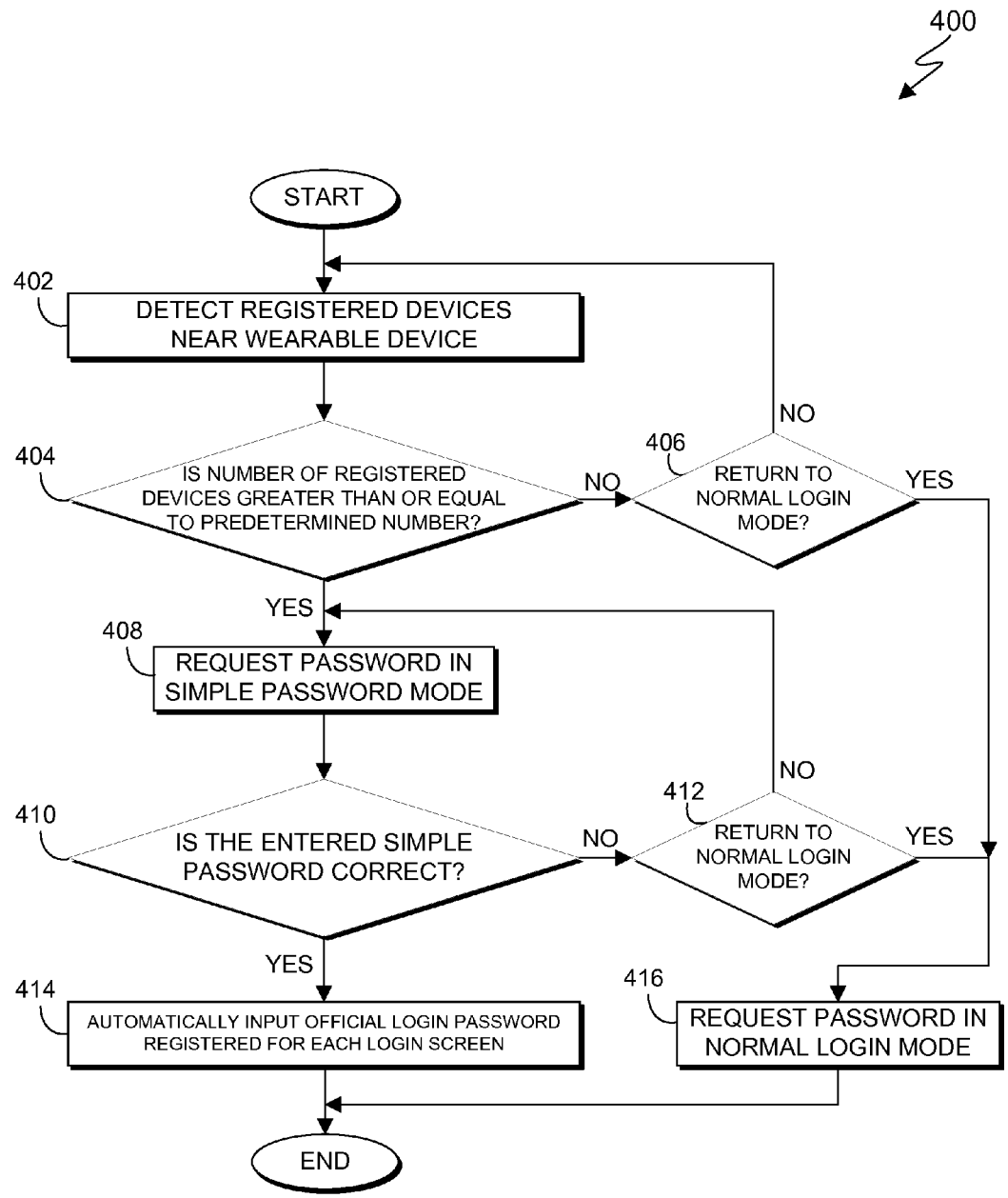
FIG. 4 is a flowchart depicting operational steps for using the registered simple password to log into the simple password application, in accordance with an embodiment of the present invention.

FIG. 4 is a flowchart, 400, depicting operational steps for using the registered simple password to log into simple password application 122, in accordance with an embodiment of the present invention.

In step 402, simple password application 122 detects registered devices near wearable device 120.

In step 404, simple password application 122 determines whether the number of registered devices detected is greater than or equal to the predetermined number. In this exemplary embodiment, the predetermined number is the number of registered devices selected by the user for the simple password. For example, if the user selects devices 130A and 130B for the simple password, then the predetermined number is two (i.e., two registered devices used in the simple password).

If, in step 404, simple password application 122 determines that the number of registered devices detected is less than the predetermined number, then in step 406 simple password application 122 prompts the user to determine whether to return to normal login mode. For example, if the registered simple password is 130A-130C-130E-130B then at least devices 130A, 130B, 130C, and 130F must be detected (i.e., a predetermined number of four).

If, in step 406, the user chooses to return to normal login mode, then in step 416 simple password application 122 will request the normal password in normal login mode.

If, in step 406, the user chooses to stay in simple password mode, simple password application 122 will continue to detect registered devices surrounding wearable device 120 (step 402) until the number of registered devices detected is greater than or equal to the predetermined number.

If, in step 404, simple password application 122 determines that the number of registered devices detected is greater than or equal to the predetermined number, then in step 408, simple password application 122 will request the simple password in simple password mode. In this exemplary embodiment, simple password application 122 will prompt the user to select the displayed registered devices in the correct order, according to the registered simple password. For example, if the registered simple password is 130A-130C-130E-130B, the user must enter the simple password by selecting, in order, devices 130A-130C-130E-130B.

In step 410, simple password application 122 determines whether the entered simple password is correct.

If, in step 410, simple password application 122 determines that the simple password entered by the user is correct, then in step 414 simple password application 122 automatically inputs the official login password registered for each login screen. In this exemplary embodiment, upon successful entry of the simple password, simple password application 122 will enter all login information to wearable device 120 (i.e., normal username and password) and all login information for any applications on wearable device 120 so as to grant user access to wearable device 120 and its applications. For example, if the user inputs the correct simple password, simple password application 122 will enter login information for wearable device 120 and the login information for the email application located on wearable device 120.

If, in step 410, simple password application 122 determines that the simple password entered by the user is not correct, then in step 412 simple password application 122 prompts the user to choose whether to return to normal login mode.

If, in step 412, the user chooses to return to normal login mode, then in step 416 simple password application 122 requests the normal password in normal login mode.

If, in step 412, the user chooses to not return to normal login mode (i.e., stay in simple password mode), then simple password application 122 will return to step 408 and request the password in simple password mode. In this exemplary embodiment, simple password application 122 will request that the user re-enter the simple password.

Accordingly, by performing the operational steps of FIG. 4, simple password application 122 prompts a user to log onto wearable device 120 using either a simple password or a normal password.

Figure 5:
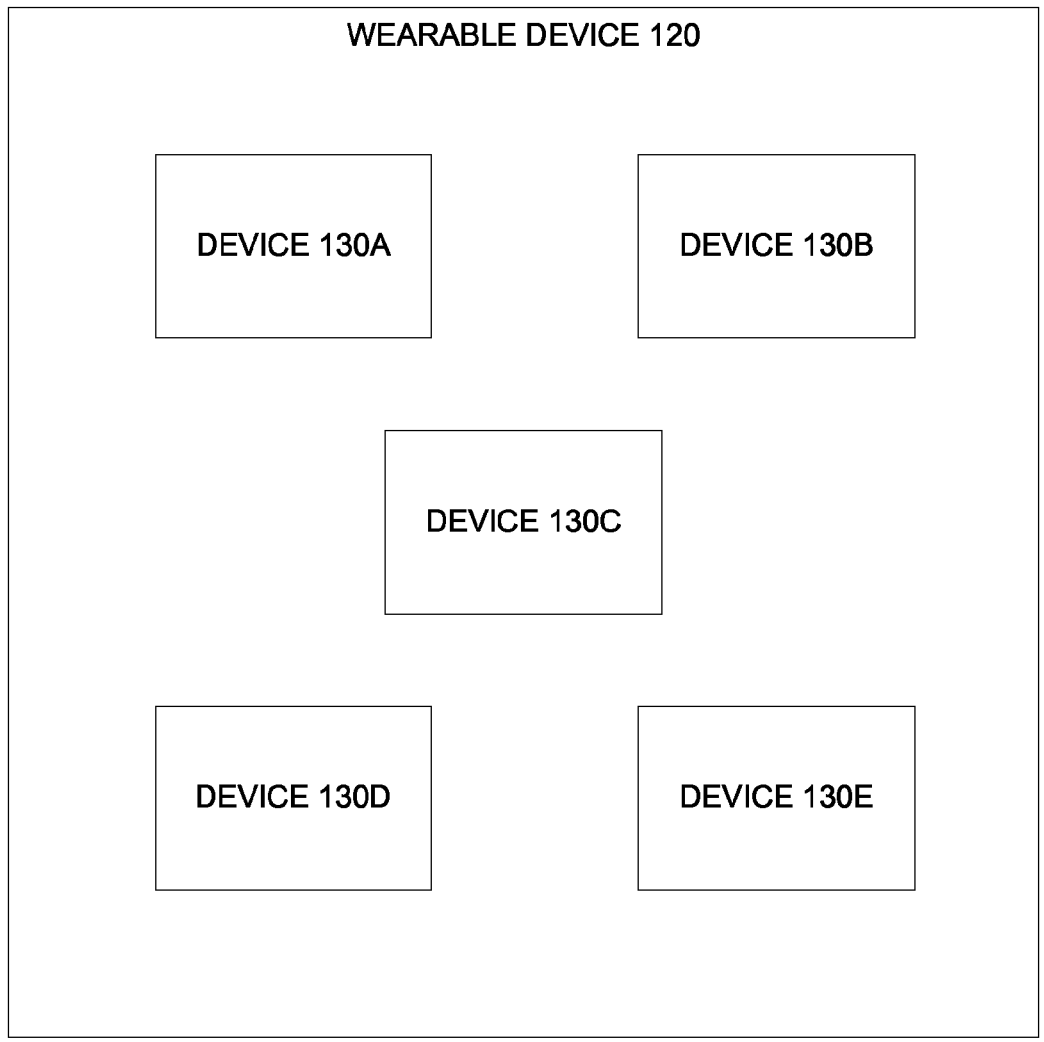
FIG. 5 is an example diagram of the screen display of a wearable device using simple password application, in accordance with an embodiment of the present invention.

FIG. 5 is an example diagram of the screen display of a wearable device using simple password application, in accordance with an embodiment of the present invention. In this exemplary embodiment, devices 130A, 130B, 130C, 130D, and 130E (devices 130A-E) are registered with simple password application 122. Wearable device 120 displays devices 130A-E for simple password input. For example, if registered simple password is device 130A-device 130D-device 130E-device 130B-device 130C then the user must select, in order, device 130A-device 130D-device 130E-device 130B-device 130C on wearable device 120 display. However, it should be appreciated that the registered password need not include every registered device. In another example, if registered simple password is device 130A-device 130E-device 130B-device 130C then the user must select, in order, device 130A-device 130E-device 130B-device 130C on wearable device 120 display.

Figure 6:
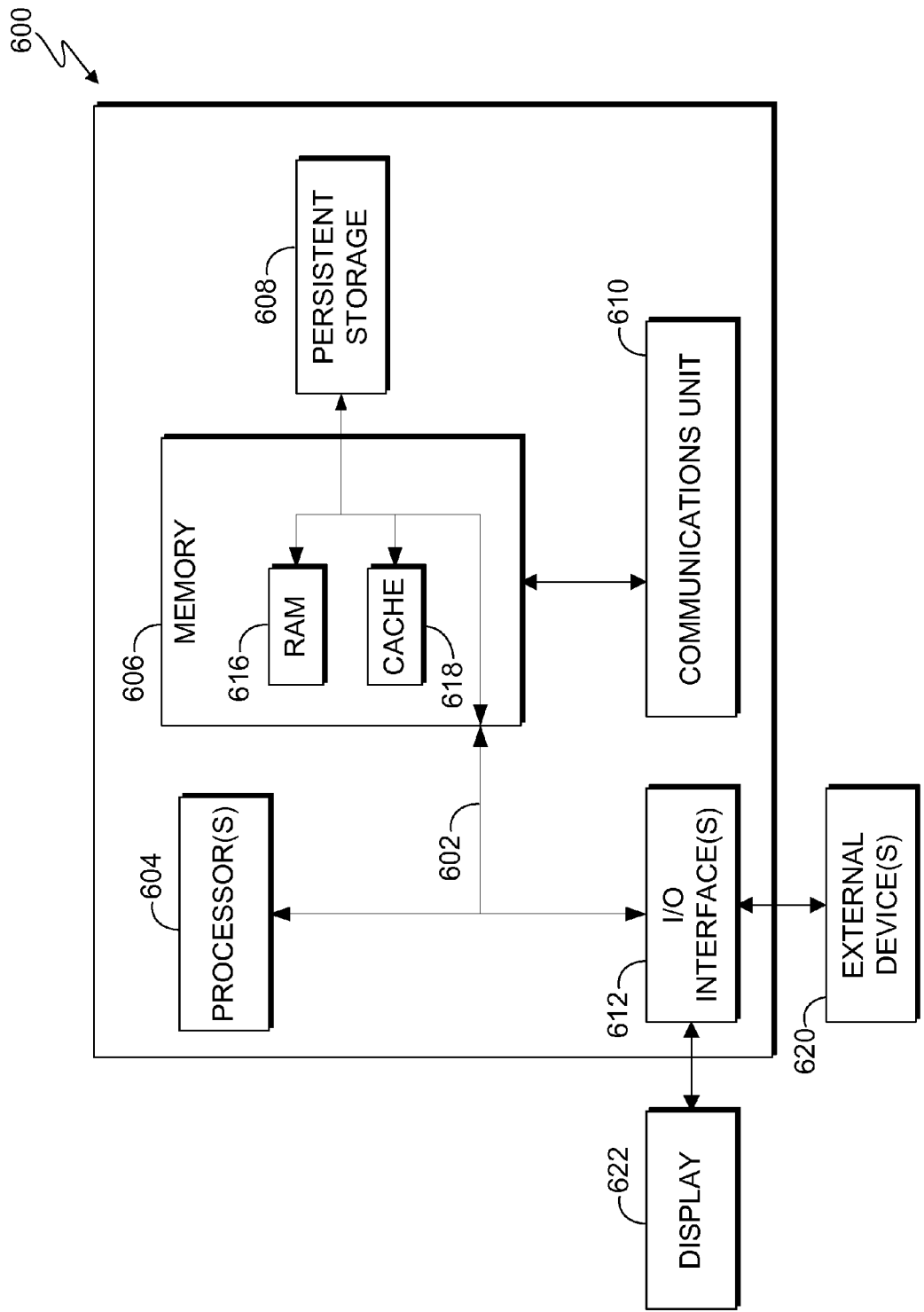
FIG. 6 is a block diagram of internal and external components of a computer system, in accordance with an embodiment of the present invention.

FIG. 6 is a block diagram of internal and external components of computing device 600, which is representative of the computing devices of FIG. 1, in accordance with an embodiment of the present invention. It should be appreciated that FIG. 6 provides only an illustration of one implementation and does not imply any limitations with regard to the environments in which different embodiments may be implemented. In general, the components illustrated in FIG. 6 are representative of any electronic device capable of executing machine-readable program instructions. Examples of computer systems, environments, and/or configurations that may be represented by the components illustrated in FIG. 6 include, but are not limited to, personal computer systems, server computer systems, thin clients, thick clients, laptop computer systems, tablet computer systems, cellular telephones (i.e., smart phones), multiprocessor systems, microprocessor-based systems, network PCs, minicomputer systems, mainframe computer systems, and distributed cloud computing environments that include any of the above systems or devices.

Computing device 600 includes communications fabric 602, which provides for communications between one or more processing units 604, memory 606, persistent storage 608, communications unit 610, and one or more input/output (I/O) interfaces 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer readable storage media. In this embodiment, memory 606 includes random access memory (RAM) 616 and cache memory 618. In general, memory 606 can include any suitable volatile or non-volatile computer readable storage media. Software is stored in persistent storage 608 for execution and/or access by one or more of the respective processors 604 via one or more memories of memory 606.

Persistent storage 608 may include, for example, a plurality of magnetic hard disk drives. Alternatively, or in addition to magnetic hard disk drives, persistent storage 608 can include one or more solid state hard drives, semiconductor storage devices, read-only memories (ROM), erasable programmable read-only memories (EPROM), flash memories, or any other computer readable storage media that is capable of storing program instructions or digital information.

The media used by persistent storage 608 can also be removable. For example, a removable hard drive can be used for persistent storage 608. Other examples include optical and magnetic disks, thumb drives, and smart cards that are inserted into a drive for transfer onto another computer readable storage medium that is also part of persistent storage 608.

Communications unit 610 provides for communications with other computer systems or devices via a network. In this exemplary embodiment, communications unit 610 includes network adapters or interfaces such as a TCP/IP adapter cards, wireless Wi-Fi interface cards, or 3G or 4G wireless interface cards or other wired or wireless communications links. The network can comprise, for example, copper wires, optical fibers, wireless transmission, routers, firewalls, switches, gateway computers and/or edge servers. Software and data used to practice embodiments of the present invention can be downloaded to computing device 600 through communications unit 610 (i.e., via the Internet, a local area network, or other wide area network). From communications unit 610, the software and data can be loaded onto persistent storage 608.

One or more I/O interfaces 612 allow for input and output of data with other devices that may be connected to computing device 600. For example, I/O interface 612 can provide a connection to one or more external devices 620 such as a keyboard, computer mouse, touch screen, virtual keyboard, touch pad, pointing device, or other human interface devices. External devices 620 can also include portable computer readable storage media such as, for example, thumb drives, portable optical or magnetic disks, and memory cards. I/O interface 612 also connects to display 622.

Display 622 provides a mechanism to display data to a user and can be, for example, a computer monitor. Display 622 can also be an incorporated display and may function as a touch screen, such as a built-in display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for login on a wearable device, the method comprising:
   detecting, by one or more computer processors, one or more registered devices near a first wearable device, wherein said first wearable device is configured to receive a password;
   displaying, by one or more computer processors, said one or more registered devices on said first wearable device;
   determining, by one or more computer processors, whether said detected one or more registered devices is greater than or equal to a predetermined number;
   in response to determining that said detected one or more registered devices is greater than or equal to said predetermined number, requesting, by one or more computer processors, from a user, said password;
   receiving, by one or more computer processors, said password, wherein said password is an ordered selection of icons representing said one or more registered devices in a predetermined order;
   registering, by one or more computer processors, said password;
   storing, by one or more computer processors, a second set of information associated with said password;
   transmitting, by one or more computer processors, said second set of information associated with said password to a second wearable device, wherein said second wearable device is configured to receive said password;
   determining, by one or more computer processors, whether said password matches a predefined password order; and
   in response to determining that said password matches the predefined password order, automatically inputting, by one or more computer processors, a first set of login information for said first wearable device.

2. The method of claim 1, further comprising:
   in response to determining that said password matches the predefined password order, automatically inputting, by one or more computer processors, a second set of login information for one or more applications on said first wearable device.

3. The method of claim 1, further comprising:
   in response to determining that said detected one or more registered devices is less than said predetermined number, requesting, by one or more computer processors, from the user, the first set of login information for said first wearable device.

4. The method of claim 1, further comprising:
   in response to determining that said password does not match the predefined password order, requesting, by one or more computer processors, from the user, the first set of login information for said first wearable device.

5. The method of claim 1, further comprising:
   detecting, by one or more computer processors, one or more devices near a wearable device;
   receiving, by one or more computer processors, from a user, a selection of the one or more devices to register;
   in response to receiving the selection of the one or more devices to register, registering, by one or more computer processors, said one or more devices; and
   storing, by one or more computer processors, a first set of information associated with said one or more registered devices.

6. The method of claim 5, further comprising:
   transmitting, by one or more computer processors, said first set of information associated with said one or more registered devices to a second wearable device, wherein said second wearable device is configured to receive said password.

7. The method of claim 1, wherein determining whether said detected one or more registered devices is greater than or equal to a predetermined number comprises:
   determining, by one or more computer processors, the one or more registered devices defined in said password; and
   verifying, by one or more computer processors, that said detected one or more registered devices include, at least, said one or more registered devices defined in said password.

8. A computer program product comprising:
   a non-transitory computer readable storage medium and program instructions stored on the non-transitory computer readable storage medium, comprising:
   program instructions to detect one or more registered devices near a first wearable device, wherein said first wearable device is configured to receive a password;
   program instructions to display said one or more registered devices on said first wearable device;
   program instructions to determine whether said detected one or more registered devices is greater than or equal to a predetermined number;

program instructions to, in response to determining that said detected one or more registered devices is greater than or equal to said predetermined number, request from a user, said password;

program instructions to receive said password, wherein said password is an ordered selection of icons representing said one or more registered devices in a predetermined order;

program instructions to register said password;

program instructions to store a second set of information associated with said password;

program instructions to transmit said second set of information associated with said password to a second wearable device, wherein said second wearable device is configured to receive said password;

program instructions to determine whether said password matches a predefined password order; and program instructions to, in response to determining that said password matches the predefined password order, automatically input a first set of login information for said first wearable device.

9. The computer program product of claim 8, further comprising:

program instructions to, in response to determining that said password matches the predefined password order, automatically input a second set of login information for one or more applications on said first wearable device.

10. The computer program product of claim 8, further comprising:

program instructions to, in response to determining that said detected one or more registered devices is less than said predetermined number, request, from the user, the first set of login information for said first wearable device.

11. The computer program product of claim 8, further comprising:

program instructions to, in response to determining that said password does not match the predefined password order, request, from the user, the first set of login information for said first wearable device.

12. The computer program product of claim 8, further comprising:

program instructions to detect one or more devices near a wearable device;

program instructions to receive, from a user, a selection of the one or more devices to register;

program instructions to, in response to receiving the selection of the one or more devices to register, register said one or more devices; and program instructions to store a first set of information associated with said one or more registered devices.

13. The computer program product of claim 12, further comprising:

program instructions to transmit said first set of information associated with said one or more registered devices to a second wearable device, wherein said second wearable device is configured to receive said password.

14. The computer program product of claim 8, wherein the program instructions to determine whether said detected one or more registered devices is greater than or equal to a predetermined number comprises:

program instructions to determine the one or more registered devices defined in said password; and program instructions to verify that said detected one or more registered devices include, at least, said one or more registered devices defined in said password.

15. A computer system comprising:

one or more computer processors;

one or more memories;

program instructions stored on the one or more memories, wherein the one or more memories comprise:

program instructions to detect one or more registered devices near a first wearable device, wherein said first wearable device is configured to receive a password;

program instructions to display said one or more registered devices on said first wearable device;

program instructions to determine whether said detected one or more registered devices is greater than or equal to a predetermined number;

program instructions to, in response to determining that said detected one or more registered devices is greater than or equal to said predetermined number, request from a user, said password;

program instructions to receive said password, wherein said password is an ordered selection of icons representing said one or more registered devices in a predetermined order;

program instructions to register said password;

program instructions to store a second set of information associated with said password;

program instructions to transmit said second set of information associated with said password to a second wearable device, wherein said second wearable device is configured to receive said password;

program instructions to determine whether said password matches a predefined password order; and program instructions to, in response to determining that said password matches the predefined password order, automatically input a first set of login information for said first wearable device.

16. The computer system of claim 15, further comprising:

program instructions to detect one or more devices near a wearable device;

program instructions to receive, from a user, a selection of the one or more devices to register;

program instructions to, in response to receiving the selection of the one or more devices to register, register said one or more devices; and program instructions to store a first set of information associated with said one or more registered devices.

17. The computer system of claim 15, wherein the program instructions to determine whether said detected one or more registered devices is greater than or equal to a predetermined number comprises:

program instructions to determine the one or more registered devices defined in said password; and program instructions to verify that said detected one or more registered devices include, at least, said one or more registered devices defined in said password.

* * * * *